United States Patent
Möhlmann

(10) Patent No.: US 10,598,266 B2
(45) Date of Patent: Mar. 24, 2020

(54) MOTOR VEHICLE BALANCING

(71) Applicant: GKN Automotive Ltd., Redditch, Worcestershire (GB)

(72) Inventor: Reinhard Möhlmann, Bergisch Gladbach (DE)

(73) Assignee: GKN Automotive Ltd., Redditch, Worcestershire (GB)

( * ) Notice: Subject to any disclaimer, the term of this patent is extended or adjusted under 35 U.S.C. 154(b) by 205 days.

(21) Appl. No.: 15/557,479

(22) PCT Filed: Mar. 19, 2015

(86) PCT No.: PCT/EP2015/055839
§ 371 (c)(1),
(2) Date: Sep. 12, 2017

(87) PCT Pub. No.: WO2016/146201
PCT Pub. Date: Sep. 22, 2016

(65) Prior Publication Data
US 2018/0058564 A1 Mar. 1, 2018

(51) Int. Cl.
*F16H 48/19* (2012.01)
*B60K 23/08* (2006.01)
(Continued)

(52) U.S. Cl.
CPC ......... *F16H 48/19* (2013.01); *B60K 23/0808* (2013.01); *F16D 25/10* (2013.01);
(Continued)

(58) Field of Classification Search
CPC ............... F16H 48/19; B60K 23/0808; B60K 2023/043; B60K 2023/0866
(Continued)

(56) References Cited

U.S. PATENT DOCUMENTS 5,189,930 A  3/1993  Kameda
5,279,384 A  1/1994  Shibahata et al.
(Continued)

FOREIGN PATENT DOCUMENTS

CN   1911700 A   2/2007
CN   102958734 A  3/2013
(Continued)

OTHER PUBLICATIONS

International Search Report and Written Opinion for PCT/EP2015/055839 dated Dec. 1, 2015 (with English translation; 13 pages).
(Continued)

*Primary Examiner* — Ha Dinh Ho
(74) *Attorney, Agent, or Firm* — Bejin Bieneman PLC

(57) ABSTRACT

For the operation of a gearless clutch-controlled differential unit with a first clutch and a second clutch, without abandoning the possibility of assigning different torques to the clutches, it is provided that a control variable originally generated by a control variable unit is supplied to the first clutch unchanged while the control variable is supplied to the second clutch subject to the intermediate connection of an individual control element. The first and second clutches have clutch characteristics that are distinct from one another.

19 Claims, 2 Drawing Sheets

(51) Int. Cl.
  *B60K 23/04* (2006.01)
  *F16D 25/10* (2006.01)
  *F16D 48/06* (2006.01)

(52) U.S. Cl.
  CPC ...... *F16D 48/062* (2013.01); *B60K 2023/043* (2013.01); *B60K 2023/0858* (2013.01); *B60K 2023/0866* (2013.01); *F16D 2500/1026* (2013.01); *F16D 2500/1045* (2013.01); *F16D 2500/10425* (2013.01); *F16D 2500/7044* (2013.01)

(58) Field of Classification Search
  USPC .......................................................... 74/650
  See application file for complete search history.

(56) References Cited

U.S. PATENT DOCUMENTS

| | | | | |
|---|---|---|---|---|
| 6,817,434 | B1* | 11/2004 | Sweet | B60K 23/0808 180/197 |
| 7,395,736 | B2* | 7/2008 | Davidsson | B60K 17/35 192/48.614 |
| 7,530,421 | B2 | 5/2009 | Mori et al. | |
| 2009/0298648 | A1* | 12/2009 | Sigmund | F16D 48/0206 477/169 |
| 2013/0199883 | A1* | 8/2013 | Akiba | F16D 25/082 192/48.609 |

FOREIGN PATENT DOCUMENTS

| | | |
|---|---|---|
| DE | 4039391 A1 | 6/1991 |
| DE | 4021747 A1 | 1/1992 |
| EP | 1967405 A1 | 9/2008 |
| EP | 2116411 A1 | 11/2009 |
| WO | 2015090392 A1 | 6/2015 |

OTHER PUBLICATIONS

State Intellectual Property Office of the People's Republic of China First Office Action for Chinese Patent Application No. 201580077998.8 dated Mar. 2, 2019 (11 pages; with English translation).

* cited by examiner

MOTOR VEHICLE BALANCING

CROSS-REFERENCE TO RELATED APPLICATIONS

This application is a national stage of, and claims priority to, Patent Cooperation Treaty Application No. PCT/EP2015/055839, filed on Mar. 19, 2015, which application is hereby incorporated herein by reference in its entirety.

BACKGROUND

Motor vehicle clutch controlled differential units and systems and methods for their operation are known for example from EP 2 116 411 A1 or DE 40 39 391 A1. Here, two control valves which are separately activatable are used in each case to specifically activate the first and second clutch respectively with a certain control pressure in order to influence the clutch moment to be transmitted from the respective clutch to the associated drive wheel as a function of the driving state. These configurations make it possible to apply different torques to the right and left drive unit and in approximately any conceivable driving situation adjust the desired power or moment distribution over the two drive wheels of an axle and specifically intervene in a correcting manner in critical driving situations.

Disadvantageous in the systems and methods mentioned above however is their complexity. They require hardware and software which are complex and potentially prone to malfunctioning, and a multitude of components. The development and application expenditure in the case of a vehicle is high. If, furthermore, it is taken into account that such systems and methods are generally provided as all-wheel modules for vehicles with all-wheel drive that can be switched off or added on and the actual driving proportion in all-wheel drive mode during the lifespan of a vehicle is typically very low, the expenditure for the development and application of such a system and method is not infrequently considered too high and too expensive by the manufacturers. This applies in particular to manufacturers of vehicles below the premium segment and of vehicle types which, because of their intended purpose, do not have any particular need for such systems as can be the case for example with off-road vehicles.

Furthermore, systems and methods for activating a gearless, clutch-controlled differential unit of a motor vehicle are known or in development, in the case of which the two clutch sides are each always supplied with the same value of a control variable responsible for the respective clutch moment. However, such systems have the disadvantage that the one drive wheel can no longer be assigned a transmittable drive moment which differs from the transmittable drive moment assigned to the other drive wheel. The specific adjusting of a yaw moment for influencing the active yaw function or a slip that is adjustable individually for each side is no longer possible. With such systems, which are described in the international Patent Application PCT/EP2013/077248 or the German Disclosure Publication DE 40 21 747 A1, a substantial advantage is therefore forfeited which gearless, clutch-controlled differential units with individually activatable clutches offer in principle.

SUMMARY

The present disclosure relates to a system for activating a gearless, clutch-controlled differential unit of a motor vehicle, in particular of a passenger car, according to the preamble of claim 1 and to a method for controlling such a differential unit according to the preamble of claim 10. In addition, the disclosure relates to a computer program product which causes an electronic control unit for controlling such a differential unit to activate the differential unit according to the method and to the control unit itself. In addition, the disclosure relates to a gearless clutch-controlled (transverse) differential unit of a motor vehicle, in particular of a passenger car.

Disclosed herein is a differential unit of the type mentioned above, a system for operating a gearless differential unit, and a method for operating such a differential unit which in its complexity is reduced compared with the known systems and methods with individually activatable side shaft clutches and which makes possible at least within wide limits an individual activation of both side shaft clutches with different torques or individual side-slip. Here, a drive concept with add-on all-wheel drive in particular is considered, wherein the differential unit can be part of an add-on secondary axle. A way is to be found to simplify the complex systems and methods by reducing the technical expenditure among other things also with the objective of making the systems and methods attractive also for vehicle manufacturers of vehicles below the premium segment without in the process forfeiting the possibility of supplying the two clutches differently.

With respect to the differential unit the first clutch and the second clutch have clutch characteristics that are distinct from one another. With respect to the system and method for operating such a differential unit it is provided that the control variable made available by the control variable unit (e.g., a value that is an amount of pressure, as explained further below) is supplied to the first clutch without intermediate connection of an individual control element (located downstream of the control variable unit), while the control variable made available by the control variable unit is supplied to the second clutch subject to the intermediate connection of an individual control element located downstream of the control variable unit.

The control variable made available by the control variable unit is thus supplied to the first clutch without intermediate connection of an individual control element (located downstream of the control variable unit). The value of the control variable acting on the first clutch thus corresponds—not taking into account any losses such as transmission losses—to the value of the control variable originally made available by the control variable unit. The adjusting of the value of the control variable acting on the actuation mechanism of the first clutch is effected by way of influencing control variable unit by means of a suitable control unit. Accordingly, the value of the control variable originally generated by the control variable unit is variable in a first step via a specific activation of the control variable unit by means of a control device.

The second clutch, by contrast, is assigned an individual control element located downstream of the control variable unit. The individual control element assigned to the second clutch ensures that the control variable originally made available by the control variable unit is additionally influenceable, in particular reducible, in the value for the second clutch in a second step, and is supplied to the second clutch in a different value, in particular in a reduced value, compared with the first clutch.

In this way, both clutches can be individually activated with a different control variable values.

The system described above or the method described above simplifies prior systems that make possible an activation of the two clutch sides with a control variable differing respective values. On the one hand, an individual control element such as a pressure regulating valve can be omitted at least on one side. Furthermore, the control software to be developed need no longer ensure the individual activation of two single individual control elements so that the application expenditure and the expenditure for the control hardware to be used is reduced, and a part of the measurement and control technology to be employed, up to now requiring hardware such as cables or connectors, is no longer required. At the same time—other than with systems in the case of which both clutches are always activated identically—the decisive advantage of such systems, in particular realizing an active yaw function, is largely retained.

It is possible that the control variable is a pressure value or amount, the system comprises a rotational speed-regulated hydraulic pump as control variable unit, and the control variable change ensured by the control variable unit is effected directly via the change of the rotational speed of the hydraulic pump. Thus, the hydraulic pump which is specifically activatable via a control device initially makes possible a central generation and variation of the control variable (of the hydraulic pressure) by influencing the pump rotational speed in a first step. The individual control element (a pressure regulating valve) assigned to the second clutch then makes possible in a second step the change (the reduction) of the pressure originally generated by the hydraulic pump for the second clutch while the pressure originally generated by the hydraulic pump is supplied to the first clutch unchanged (except for any transmission losses), in particular without an individual control element located downstream of the hydraulic pump.

However, depending on the actually used clutch actuation mechanism, the control variable units can be different, for example, current, mechanical force, magnetic force or pneumatic pressure.

Because the individual control element assigned to the second clutch generally does not make possible an increase but only a reduction of the control variable acting on the second clutch, the first clutch and the second clutch should be matched to one another with respect to their clutch characteristics in such a manner that when both clutches are supplied with the control variable in the same value the second clutch is capable of transmitting a greater clutch moment than the first clutch. For adjusting the same transmittable drive moment, a lower pressure is then required at the second clutch than at the first clutch. Because of this it is ensured with an individual control element, which is only able to reduce the value of the control variable made available by the control variable unit, that, by influencing the control variable unit by means of the individual control element downstream of the control variable unit, the second clutch can be assigned a transmittable clutch moment that is higher and one that is lower than can be assigned to the first clutch.

Matching the characteristics of the first and second clutch in the sense described above can provide in particular that the second clutch has a pressure point that is distinct from the first clutch, in particular a pressure point that is lower compared with the first clutch. This contributes to the fact that the second clutch when supplied with the control variable in the same value in particular when the clutches are operated with a control variable of a low value, has a higher transmittable moment than the first clutch.

Alternatively or additionally to this it can be provided that the second clutch has an effective clutch friction area that is distinct from the first clutch, in particular an effective clutch friction area that is larger compared with the first clutch. When using a disk-type friction clutch, this can be ensured in particular by a different number of clutch disks.

Furthermore, it can be provided alternatively or additionally to the measures described above that the second clutch has an effective clutch diameter that is distinct from the first clutch, in particular an effective clutch diameter that is larger compared with the first clutch.

Through the above measures it is ensured that when the second clutch is supplied with the control variable in the same value as the first clutch the second clutch has a higher transmittable moment than the first clutch. Nevertheless, the control variable supplied to the second clutch could be minimized by the individual control element assigned to the second clutch in such a manner that the moment that is transmittable by the second clutch falls below the moment that is transmittable by the first clutch.

The differential unit per se, in the case in which the first clutch and the second clutch have clutch characteristics that are distinct from one another, and a drive train having such a differential unit, are likewise included in this disclosure, which in each case comprise a system for operating the differential unit as described above and below. An electronic control unit (ECU), in the program memory of which a computer program product is stored, which is equipped for carrying out the method explained above and below, is also included in this disclosure.

Further features and advantages are obtained from the subclaims and from the following description of preferred exemplary embodiments by way of the drawings.

DETAILED DESCRIPTION

Figure 1:
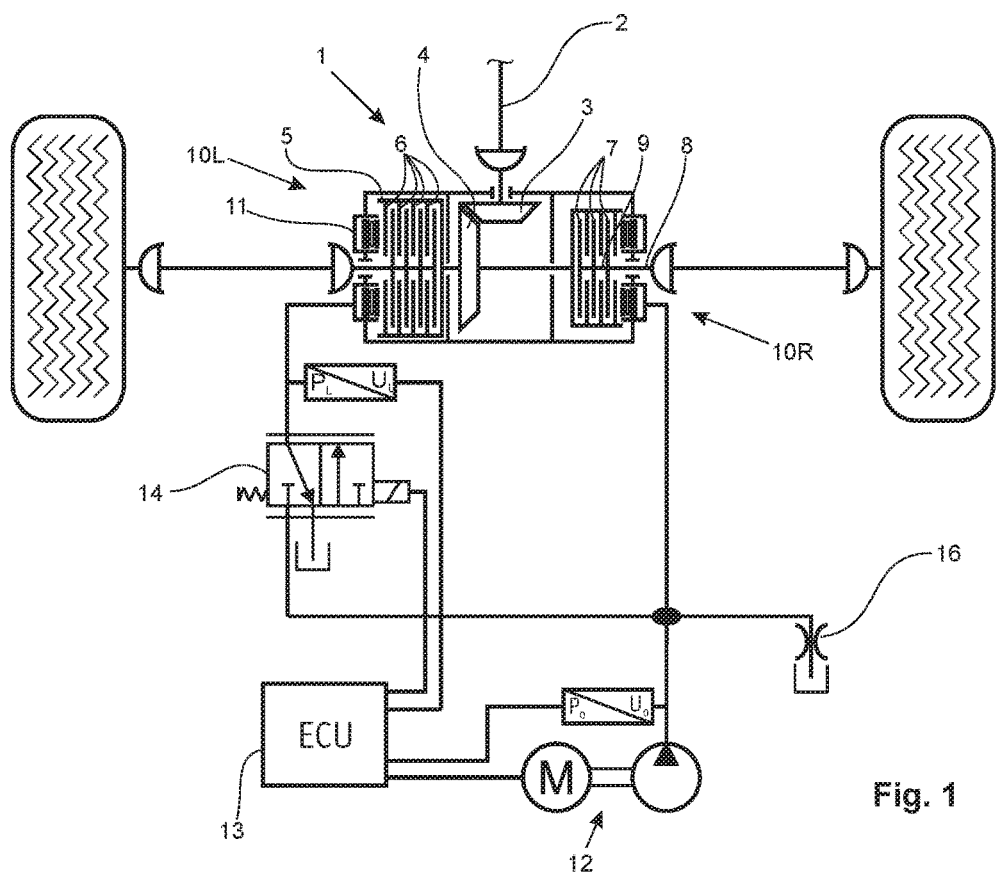
FIG. 1 shows an example clutch-controlled, gearless differential unit with a control device in a schematic representation.

In FIG. 1, a differential unit 1 together with a system for its operation is shown in a schematic view. The characters "L" and "R" assigned to certain reference symbols in the figures stand for the respective left ("L") or right ("R") component of the, in parts, symmetrical basic structure.

The drive power of the vehicle drive is transmitted via an input element 2, typically a cardan shaft, and a drive wheel 3 connected to the same, to a ring gear 4 and from there to left and right drive disk carriers 5, which in each case are assigned drive disks 7 which are arranged axially moveably in a rotationally fixed manner. These drive disks 7 interact with left or right output disks 7 which in turn interact with a left or right output element 8 in a rotationally fixed manner and are arranged on a left or right output disk carrier 9 axially moveably but in a rotationally fixed manner. The left or right clutch unit 10 so formed represents a disk clutch which is known in principle.

Both the right clutch unit and also the left clutch unit are each assigned a clutch actuator 11 to be actuated possibly hydraulically, wherein alternatively to a hydraulic clutch actuation other clutch actuation mechanisms are also possible, in particular electromechanical, electromagnetic electrohydraulic or pneumatic operating clutch actuation devices.

By way of the clutch actuators 11, the clutch units are activated and by way of the control variable "hydraulic pressure," the clutch pressure, i.e., the pressure force with which the output or drive disks are pressed against one another, is influenced for each of the clutches so that the moment that is transmittable by the clutches can be specifically set by the value of the control variable supplied to the clutch actuation device. In the case of clutch actuation devices which do not operate with hydraulic pressure, the control variable—depending on the chosen action mechanism—could be for example a mechanical force, electric current, electric voltage or pneumatic pressure.

In the figures, the drive disk carrier 5 coupled to the input element 2 in a rotationally fixed manner is embodied as an outer disk carrier and the output disk carrier 9 that is coupled to the drive wheels in a rotationally fixed manner as inner disk carrier. It will be readily understood that this configuration can also be reversed.

In FIG. 1, a system for operating and activating the left or right clutch unit is shown, in the case of which the left or right of the two clutches 10 can be individually activated with a different pressure depending on the driving state. In FIG. 1, the right clutch 10R exemplarily forms the "first clutch" and the left clutch 10L the "second clutch" in terms of the invention. This arrangement is exemplary and can be reversed.

An electronic control unit 13 detects the pressures $p_O$ and $p_L$ that are present in the system and, based on stored characteristic maps and taking into account driving state data (wheel speeds, acceleration forces, vehicle inclination, speed, steering angle, etc.), individually activates the left or right clutch with the control variable "hydraulic pressure."

The output pressure $p_O$ originally generated by a motor-operated hydraulic pump unit 12 in a first (pressure generation) stage is generated by the pump unit 12 by setting the appropriate pump rotational speed at a value that is a function of the driving state and, in the value generated by the pump unit 12, acts directly on the clutch actuator 11R. An orifice 16 ensures better regulatability of the output pressure $p_O$ and renders a pump unit, which for lowering the output pressure would have a second direction of rotation, dispensable in particular for the cases in which the output pressure $p_O$ has to be rapidly minimized.

The pressure $p_O$ generated by the hydraulic pump unit 12 is used at least indirectly also for activating the left clutch 10L, wherein, between the hydraulic pump unit 12 and the clutch actuator 11L, in individual control element 14, a pressure regulating valve is provided, which is capable of down-regulating the pressure $p_O$ generated by the hydraulic pump unit for the right clutch 10R in a second (pressure reducing) stage. The pressure $p_R$ acting on the right clutch 10R in this case is always smaller or equal to the output pressure $p_O$ generated by the hydraulic pump 12 (the control variable unit). $p_O \geq p_L$ applies.

The "supply" of the first clutch with the control variable influencing the pressure force of the clutch disks accordingly takes place without further individual control elements, in the case of the use of a hydraulic pump unit 12 shown in FIG. 1 in particular without pressure regulating valves connected downstream of the pump unit 12. The value of the control variable "hydraulic pressure" is regulated for the case shown in FIG. 1, via the pump output of the hydraulic pump unit, in particular by way of the delivery output, that is variable with the rotational speed of said pump unit. In the case of other types of clutch actuation mechanisms this statement is, as will be readily understood, equally true for the control variable then utilized for influencing the transmittable clutch moment.

In order to be able to activate the left clutch 10L despite the configuration shown in FIG. 1, in the case of which the control variable $p_L$ to the left clutch 10L is always smaller or equal in the value to the control variable $p_O$ supplied to the right clutch 10L in such a manner that in a certain driving state the drive moment that is transmittable with the left clutch 10L is greater than the drive moment that is transmittable with the right clutch 10L, it is provided that the left clutch 10L has different clutch characteristics than the right clutch 10L. It is provided in particular that the left clutch 10L, when supplied with a control variable in the same value, is capable of transmitting a greater drive moment than the right clutch 10L, or that, upon an adjustment of the control variables $p_O$ and $p_L$ in a manner such that both clutches are adjusted to the same transmittable drive moment, the control variable assigned to the left clutch 10L is lower in value than the control variable assigned to the right clutch 10R.

For this reason, in FIG. 1 the right clutch 10R is configured differently than the left clutch 10L. The right clutch 10R as can be seen has a lower number of clutch disks and a lower effective clutch diameter. It additionally has a higher pressure point, as will be explained below.

Figure 2:
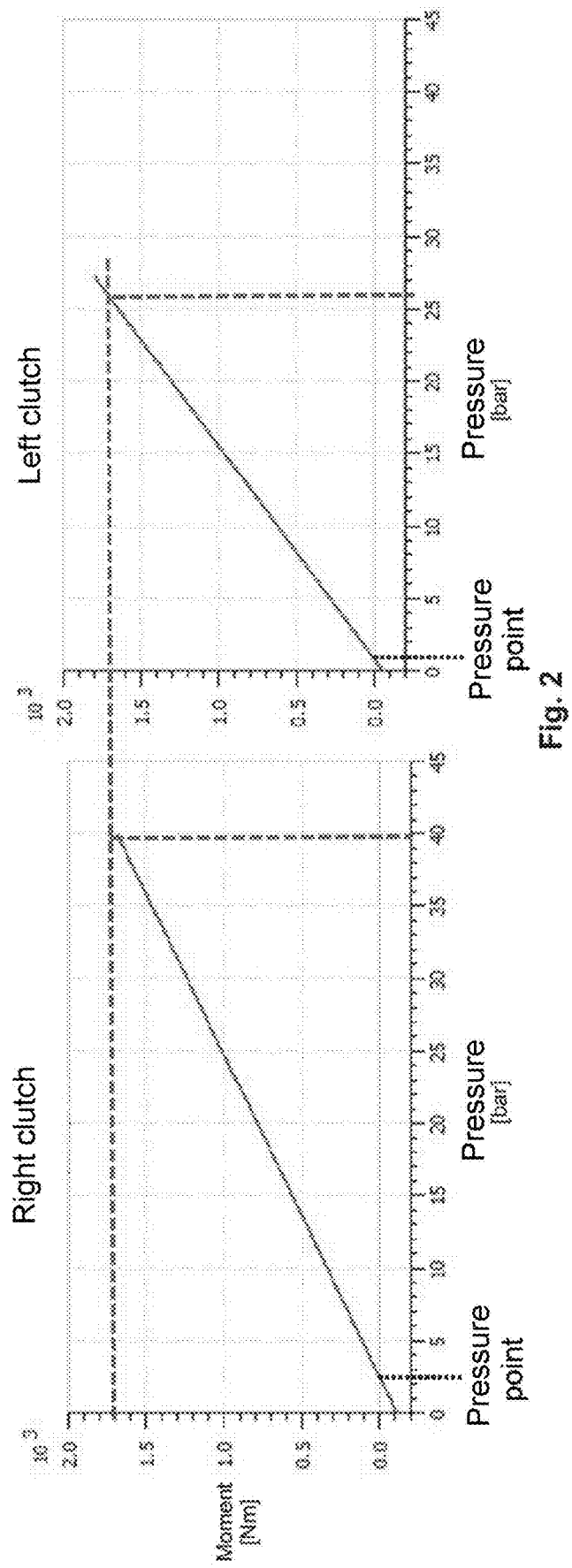
FIG. 2 shows an example representation of possible clutch characteristic lines of the first clutch and the second clutch.

FIG. 2 exemplarily shows the clutch characteristic lines of a left clutch 10L and a right clutch 10R as they could be employed. On the x-axis the pressure acting on the clutch actuation mechanism is plotted in each case; on the y-axis, the moment transmission potential of the respective clutch materializing corresponding to the applied pressure is plotted. By the different profiles of the clutch characteristic lines it can be seen that the right clutch with the same pressure is capable of transmitting significantly less moment than the left clutch (in FIG. 2 approximately 1,000 Nm on the right and approximately 1,600 Nm on the left each at 25 bar).

As a further measure for influencing the clutch characteristics it is provided that the pressure point of the right clutch (the value of the control variable with effect from which the respective clutch starts transmitting drive moment) lies above the pressure point of the left clutch (in FIG. 2 exemplarily on the right approximately 2.5 bar and left approximately 1 bar).

Figure 3:
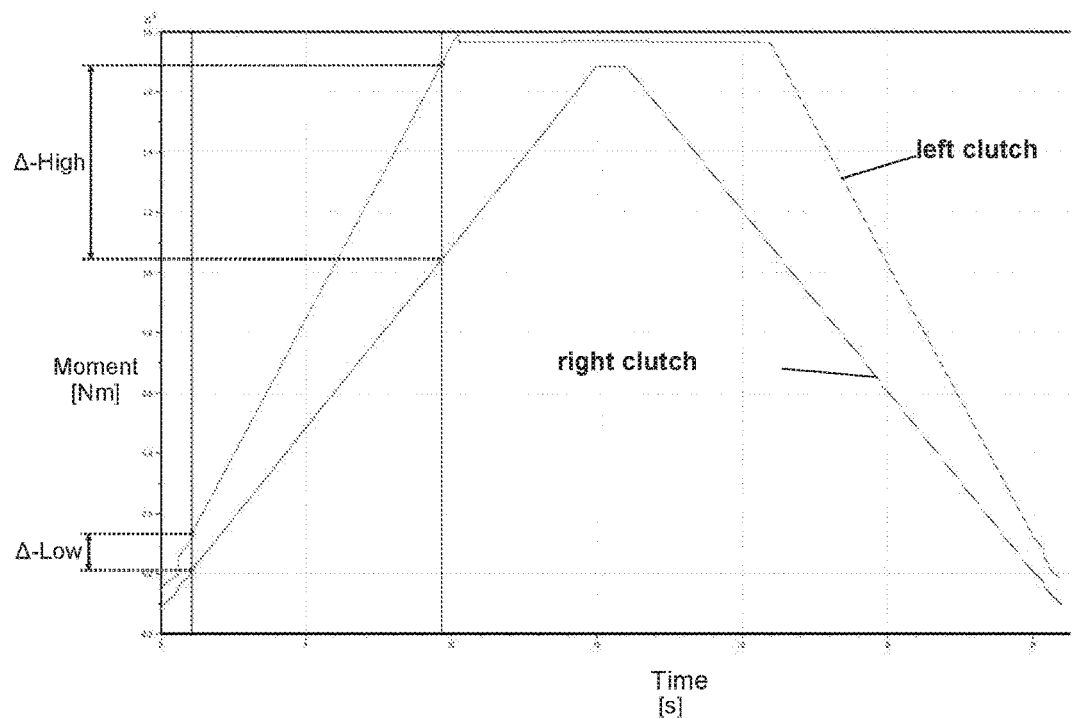
FIG. 3 shows an example representation of the moment transmission potential of both clutches over the time axis with continuously initially steadily increasing and then steadily falling pressure.

FIG. 3 shows a representation of the moment transmission potential of both clutches over the time axis initially with continuously steadily rising and then steadily falling pressure.

On the one hand, the differential of the respective transmittable torque potential Δ-low realizable between the clutches can be read off the y-axis. This is the minimal differential of the torque transmittable in each case by the clutches in the pressure point of the right clutch (of weaker configuration). At the pressure at which the right clutch just starts to engage, the left clutch in the example illustrated in FIG. 3 is already capable of transmitting approximately 120 Nm.

The differential of the respective transmitted torque potential Δ-high, at which the left clutch (the stronger clutch) reaches the maximum torque potential of the right clutch (the weaker clutch), which can be maximally realized between the clutches, can likewise be read off the y-axis. This differential in the example shown in FIG. 3 is approximately 630 Nm.

From this the example illustrated in the FIGS. 2 and 3 can be read off, that with the system a torque differential between right and left clutch and thus between right and left output side of the differential unit of between 120 Nm and approximately 630 Nm can be realized independently of whether more or less torque transmission potential is assigned to the right or the left clutch.

LIST OF REFERENCE CHARACTERS

1 Differential unit
2 Input element
3 Drive wheel
4 Ring gear
5 Drive disk carrier
6 Drive disks
7 Output disks
8 Output element
9 Output disk carrier
10 Clutch unit
11 Clutch actuator
12 Hydraulic pump unit
13 Electronic control unit
14 Individual control element
15 Drive wheels
16 Hydraulic orifice
L/R Left/Right

The invention claimed is:

1. A system for activating a gearless differential unit of an axle of a motor vehicle, comprising:
   the differential unit which includes
   an input element;
   a first output element couplable to the input element via a first frictionally engaged clutch to transmit a drive moment to a first drive wheel; and
   a second output element, couplable to the input element via a second frictionally engaged clutch to transmit a drive moment to a second drive wheel;
   wherein a control variable output by a control variable unit for adjusting drive moment transmittable by the clutches is supplied to the first clutch without intermediate connection of an individual control element, while the control variable is supplied to the second clutch via the intermediate connection of an individual control element.

2. The system of claim 1, wherein the first clutch and the second clutch have clutch characteristics that are distinct from one another.

3. The system of claim 1, wherein the control variable unit is activatable for changing the value of the control variable.

4. The system of claim 2, wherein the clutch characteristics of the first clutch and the clutch characteristics of the second clutch are such that when both clutches are supplied with a control variable of the same value the second clutch is capable of transmitting a greater clutch moment than the first clutch.

5. The system of claim 2, wherein the clutch characteristics of the first clutch and the clutch characteristics of the second clutch are such that, by influencing the control variable via the individual control element, the second clutch is configured to be assigned a transmittable clutch moment that is higher, and a transmittable clutch moment that is lower, than can be assigned to the first clutch.

6. The system of claim 1, wherein the second clutch has a pressure point that is higher than a pressure point of the first clutch.

7. The system of claim 1, wherein the second clutch has an effective clutch friction area that is larger than an effective clutch friction area of the first clutch.

8. The system of claim 1, wherein the second clutch has an effective clutch diameter that is larger than an effective clutch diameter of the first clutch.

9. The system of claim 1, wherein the control variable is hydraulic pressure, the system further comprising a rotational speed-regulated hydraulic pump as the control variable unit, wherein the control variable change influencing the clutch moment of the first clutch is effected directly via the change of the rotational speed of the hydraulic pump, while the second clutch is additionally assigned an individual control element located downstream of the hydraulic pump, via which the control variable made available by the hydraulic pump is additionally reducible in the value.

10. A method for operating a gearless differential unit of an axle of a motor vehicle that can be driven at least at times, wherein the differential unit comprises
   an input element;
   a first output element couplable to the input element via a first frictionally engaged clutch in order to transmit drive power to a first drive wheel; and
   a second output element, couplable to the input element via a second frictionally engaged clutch to transmit drive power to a second drive wheel;
   the method comprising outputting, from a control variable unit, a control variable with which the first clutch and the second clutch are supplied, wherein the control variable is supplied to the first clutch without intermediate connection of an individual control element, while the control variable made available by the control variable unit is supplied to the second clutch via the intermediate connection of an individual control element.

11. The method of claim 10, further comprising actuating the first clutch and the second clutch with a clutch actuation mechanism on which the control variable acts in order to actuate the clutches, and adjusting the value of the control variable acting on the first clutch by influencing the control variable unit, and adjusting the value of the control variable acting on the second clutch by the individual control element additionally assigned to the second clutch.

12. The method of claim 10, wherein the control variable unit is a hydraulic pump and the control variable is hydraulic pressure and the change of the control variable acting on the first clutch is effected by changing the rotational speed of a hydraulic pump.

13. A gearless differential unit for an axle of a motor vehicle that can be driven at least at times, wherein the differential unit comprises:
   an input element;
   a first output element couplable to the input element via a first frictionally engaged clutch to transmit a drive moment to a first drive wheel;
   a second output element, couplable to the input element via a second frictionally engaged clutch to transmit a drive moment to a second drive wheel; and
   a control variable unit that is programmed to provide a control variable output by adjusting drive moment transmittable by the clutches that is supplied to the first clutch without intermediate connection of an individual control element, while the control variable is supplied to the second clutch via the intermediate connection of the individual control element; and
   wherein the first clutch and the second clutch have clutch characteristics that are distinct from one another.

14. The differential unit of claim 13, wherein the control variable is hydraulic pressure, the system further comprising a rotational speed-regulated hydraulic pump as the control variable unit, wherein the control variable change influencing the clutch moment of the first clutch is effected directly via the change of the rotational speed of the hydraulic pump, while the second clutch is additionally assigned an individual control element located downstream of the hydraulic pump, via which the control variable made available by the hydraulic pump is additionally reducible in the value.

15. The differential unit of claim 13, wherein the clutch characteristics of the first clutch and the clutch characteristics of the second clutch are such that when both clutches are supplied with a control variable of the same value the second clutch is capable of transmitting a greater clutch moment than the first clutch.

16. The differential unit of claim 13, wherein the clutch characteristics of the first clutch and the clutch characteristics of the second clutch are such that, by influencing the control variable via the individual control element, the second clutch is configured to be assigned a transmittable clutch moment that is higher, and a transmittable clutch moment that is lower, than can be assigned to the first clutch.

17. The differential unit of claim 13, wherein the second clutch has a pressure point that is higher than a pressure point of the first clutch.

18. The differential unit of claim 13, wherein the second clutch has an effective clutch friction area that is larger than an effective clutch friction area of the first clutch.

19. The differential unit of claim 13, wherein the second clutch has an effective clutch diameter that is larger than an effective clutch diameter of the first clutch.

* * * * *